US00RE45906E

(19) United States
(12) Reissued Patent
Amparore et al.

(10) Patent Number: US RE45,906 E
(45) Date of Reissued Patent: Mar. 1, 2016

(54) ARTICULATED ROBOT WRIST

(71) Applicant: Comau S.p.A., Grugliasco (Torino) (IT)

(72) Inventors: Mauro Amparore, Grugliasco (IT); Giorgio Pernechele, Grugliasco (IT); Giuseppe Paparella, Grugliasco (IT)

(73) Assignee: Comau S.p.A., Grugliasco (Torino) (IT)

(21) Appl. No.: 14/469,649

(22) Filed: Aug. 27, 2014

Related U.S. Patent Documents

Reissue of:
(64) Patent No.: 8,714,046
Issued: May 6, 2014
Appl. No.: 13/399,243
Filed: Feb. 17, 2012

(30) Foreign Application Priority Data

Feb. 24, 2011 (IT) ..... TO2011A0157

(51) Int. Cl.
*B25J 17/00* (2006.01)
*B25J 17/02* (2006.01)
*B25J 19/00* (2006.01)

(52) U.S. Cl.
CPC ..... *B25J 17/0283* (2013.01); *B25J 19/0025* (2013.01); *Y10T 74/20323* (2015.01); *Y10T 74/20329* (2015.01); *Y10T 74/20335* (2015.01)

(58) Field of Classification Search
CPC ..... B25J 17/0283; B25J 17/0258; B25J 17/0275; B25J 17/025; B25J 19/0025; B25J 19/0029; B25J 9/0009; B25J 9/0024; B25J 9/042; B25J 9/102; B25J 9/104; B25J 9/1025; B25J 9/106; B25J 9/126; B25J 9/146; Y10T 74/20317; Y10T 74/20335
See application file for complete search history.

(56) References Cited

U.S. PATENT DOCUMENTS 5,222,409 A * 6/1993 Dalakian ..... 74/479.01
5,606,235 A * 2/1997 Mauletti ..... 318/625

(Continued)

FOREIGN PATENT DOCUMENTS

EP 0 502 832 A1 9/1992
EP 1938930 A1 * 7/2008

(Continued)

OTHER PUBLICATIONS

Italian Search Report, Dated Sep. 30, 2011.

*Primary Examiner* — Peter C English
(74) *Attorney, Agent, or Firm* — Young Basile Hanlon & MacFarlane P.C.

(57) ABSTRACT

[Disclosed herein are embodiments of an] *An* articulated robot wrist[. One embodiment comprises a] *includes a first body, a second body and a third body. The* first body [comprising] *includes* first and second ends, the first end being for mounting on a robot component which is rotatable around a first axis[; a]. *The* second body [comprising] *includes* first and second ends, the first end being rotatably mounted on [said] *the* second end of [said] *the* first body around a second axis [inclined] *angled* with respect to [said] *the* first axis[; and a]. *The* third body [comprising] *includes* a first and a second end, the first end being rotatably mounted on [said] *the* second end of [said] *the* second body around a third axis [inclined] *angled* with respect to [said] *the* second axis. The first and third axes form an angle substantially of 90° with respect to [said] *the* second axis[, and wherein in]. *In* at least one position of [said] *the* robot wrist [said] *the* first and third axes are substantially aligned with each other.

10 Claims, 4 Drawing Sheets

(56) References Cited

U.S. PATENT DOCUMENTS

| | | | | |
|---|---|---|---|---|
| 5,664,322 | A * | 9/1997 | Best | 29/784 |
| 5,761,965 | A * | 6/1998 | Dahlquist | 74/490.03 |
| 6,347,919 | B1 * | 2/2002 | Ryan et al. | 414/217 |
| 6,658,962 | B1 * | 12/2003 | Rosheim | 74/490.05 |
| 7,320,264 | B2 * | 1/2008 | Albertsson et al. | 74/490.02 |
| 7,322,258 | B2 * | 1/2008 | Shiraki et al. | 74/490.05 |
| 7,691,098 | B2 * | 4/2010 | Wallace et al. | 606/1 |
| 7,703,349 | B2 * | 4/2010 | Nihei et al. | 74/490.02 |
| 7,780,651 | B2 * | 8/2010 | Madhani et al. | 606/1 |
| 7,836,789 | B2 * | 11/2010 | Haniya et al. | 74/490.06 |
| 7,878,088 | B2 * | 2/2011 | Tamura et al. | 74/490.01 |
| 7,914,522 | B2 * | 3/2011 | Morley et al. | 606/1 |
| 8,006,586 | B2 * | 8/2011 | Tealdi et al. | 74/490.02 |
| 8,052,185 | B2 * | 11/2011 | Madhani | 294/106 |
| 8,343,141 | B2 * | 1/2013 | Madhani et al. | 606/1 |
| 8,396,596 | B2 * | 3/2013 | Oka et al. | 700/258 |
| 8,398,355 | B2 * | 3/2013 | Holtkamp et al. | 414/217 |
| 8,425,620 | B2 * | 4/2013 | Johnson et al. | 623/57 |
| 8,434,387 | B2 * | 5/2013 | Nakagiri et al. | 74/490.01 |
| 8,631,720 | B2 * | 1/2014 | Nakagiri et al. | 74/490.02 |
| 2008/0034920 | A1 * | 2/2008 | Inoue et al. | 74/665 M |

FOREIGN PATENT DOCUMENTS

| | | | |
|---|---|---|---|
| EP | 1 970 171 | A1 | 9/2008 |
| EP | 2022609 | A1 * | 2/2009 |
| JP | 2006-289503 | | 10/2006 |
| JP | 2006-289503 | A | 10/2006 |

* cited by examiner

ARTICULATED ROBOT WRIST

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention relates in general to an articulated robot wrist.

BACKGROUND

A robot wrist is disclosed for example in European patent application EP 1938930 A1 and in European patent EP 2 022 609 B1.

SUMMARY

Disclosed herein are embodiments of an articulated robot wrist. One embodiment is of the type comprising a first body comprising a first and a second end, said first end of said first body being intended to be mounted on a robot component that is rotatable around a first axis. A second body comprises a first and a second end, said first end of said second body being rotatably mounted on said second end of said first body around a second axis [inclined] *angled* with respect to said first axis. A third body comprises a first and a second end, said first end of said third body being rotatably mounted on said second end of said second body around a third axis [inclined] *angled* with respect to said second axis. Said first and third axes are both substantially orthogonal to said second axis. In at least one position of said robot wrist, said first and third axes are substantially aligned to each other. Said first body comprises a substantially elbow-shaped portion having at its base a first opening which is directed towards said second and third bodies and which is substantially aligned to said first axis in the mounted condition of said wrist.

Said elbow-shaped portion carries an offset portion, substantially arranged side by side and spaced apart with respect to the axis of said first opening and on which there is provided said second end of said first body. Said second body comprises a cantilever portion, corresponding to said second end of said second body, which has a second opening substantially aligned to said third axis, in the mounted condition of said robot wrist said first and second openings being traversed by cables and/or tubes for the supply and/or control of a device associated to said third body of the robot wrist.

Said robot wrist can further comprise means for driving rotation of said second and third bodies, around said second and third axes, respectively. Said means for driving rotation of said second and third bodies comprises a first and a second motor carried by said offset portion of said first body, first gear means for transmission of the rotation of the output shaft of said first motor to said second body, and second gear means for transmission of rotation of the output shaft of said second motor to said third body.

The object of the present invention is that of improving a robot wrist of this type, in particular by providing a more compact structure and a simpler and more reliable kinematic chain. The object is achieved by providing a robot wrist having the features of claim 1. The claims form integral part of the technical teaching which is provided herein with reference to the invention.

BRIEF DESCRIPTION OF THE DRAWINGS

The invention will be now described, purely by way of non-limiting example, with reference to the annexed drawings, in which.

DETAILED DESCRIPTION OF EMBODIMENTS

Figure 1:
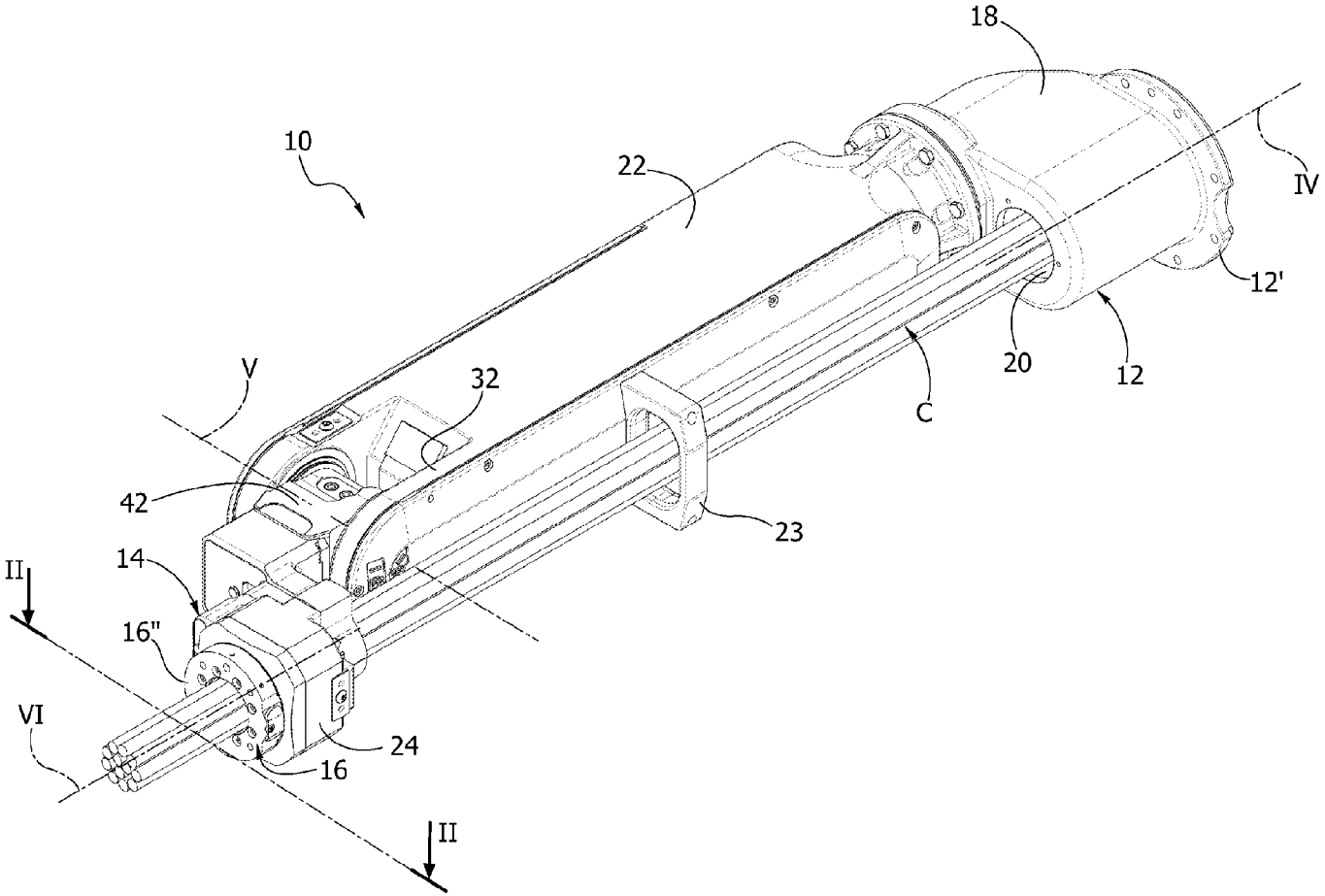
FIG. 1 represents a perspective view of the robot wrist described herein.
Figure 2:
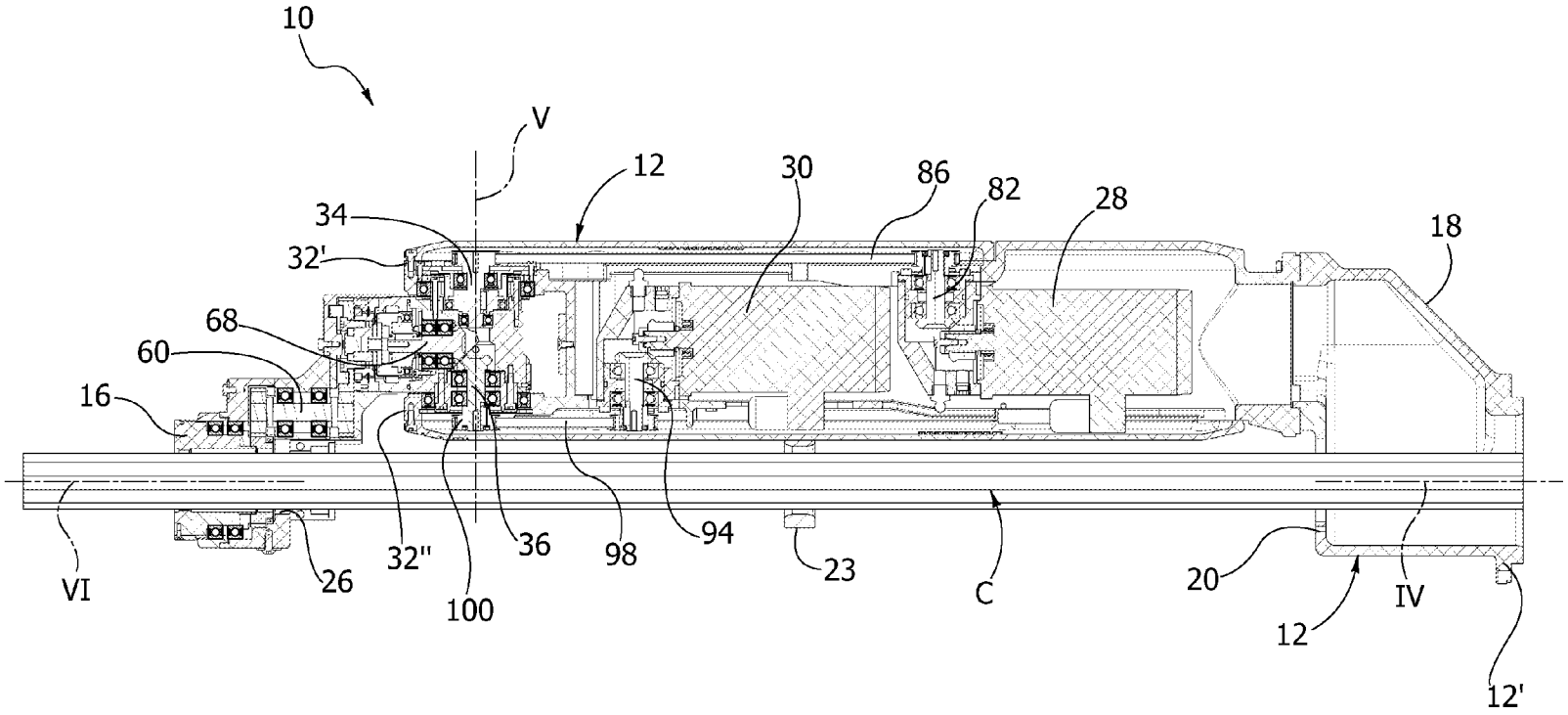
FIG. 2 shows a cross-sectional view taken along the longitudinal sectional plane diagrammatically shown by line II-II in FIG. 1.

In the following description various specific details are described in order to provide thorough understanding of the embodiments. The embodiments may be provided for example without one or more of these specific details, or through other methods, components or materials etc.

In other cases, known structures, materials or operations are not shown nor described in detail to avoid a bulky description of the various aspects of the embodiments. Therefore, references as used herein are only for convenience and do not define the scope of protection or the scope of the embodiments.

In the figures, reference numeral 10 designates an articulated robot wrist. As known in the art, a robot *wrist* of this type is to be mounted on a robot component and is to be provided with a tool or other operating apparatus which is supplied and/or controlled with cables and/or tubes which are directly associated with the structure of the wrist itself. These cables and/or tubes are shown diagrammatically in the figures and designated by reference C. They define what is called the "harness" of the robot wrist, the robot wrist being defined as being "harnessed" once the cables and/or tubes have been mounted thereon. These aspects will not be discussed herein in detail, since they are per se conventional in the art and will be explained only to the extent which is necessary for describing the wrist of the invention.

Wrist 10 comprises a first body 12 including a first end 12' and a second end 32. The first end 12' is to be mounted on a robot component (not shown) which is rotatable around a first axis IV.

Wrist 10 further comprises a second body 14 comprising a first end 42 and a second end 24. The first end 42 is rotatably mounted on the end 32 of body 12 around a second axis V [inclined] *angled* with respect to the first axis IV. Furthermore, the robot wrist 10 comprises a third body 16 comprising a first end and a second end designated by reference 16". As shown in the figures, preferably the third body 16 is an annular body which is to be traversed by cables and/or tubes of the tool associated to the wrist and whose end 16" have a surface on which there are formed suitable seats for connection of this tool.

The first end of body 16 is rotatably mounted on the second end 24 of body 14 around a third axis VI [inclined] *angled* with respect to the second axis V.

Axes IV and VI form an angle substantially of 90 degrees with respect to the second axis V (in other words, axes IV and VI are both substantially orthogonal to axis V). As shown in the figures, in given positions in space of the robot wrist, these axes are substantially aligned with each other. In particular, the configuration shown in the figures is maintained for all the positions of the wrist which, with respect to that shown, are displaced only as a result of a rotation of the wrist around axis IV.

It is to be noted that in the present description, when reference is made to an orthogonal condition between two axes or straight lines, this may be applied both to the case of lines or axes which intersect each other and are perpendicular relative to each other, and to the case of lines or axes which do not intersect with each other but have their projections on a common plane parallel to them which form an angle substantially of 90 degrees relative to each other.

More specifically, the first body 12 comprises a substantially elbow-shaped body 18 which has, at its base, a first opening 20 facing towards the second body 14 and the third body 16. In the mounted condition of the wrist, the opening 20 is substantially aligned with the first axis IV. Furthermore, the elbow-shaped portion carries an offset portion 22, substantially arranged side by side, and spaced apart, with respect to the axis of opening 20. On this offset portion the second body 14 is rotatably mounted around the second axis V. The second body has [instead] a cantilever portion 24, corresponding to the above mentioned second end of the second body 14, which has a second opening 26 substantially aligned with the third axis VI. In the mounted and harnessed condition of the robot, the first opening 20 and the second opening 26 are both traversed by cables and/or tubes C of the tool associated with the third body 16. As visible from FIG. 1, due to the general configuration which is defined by portions 18 and 22, there is formed a passage for the cables and/or tubes C such that these cables and the tubes are held within the overall lateral dimension of the robot wrist, so as to avoid that they may interfere with the operations of the wrist itself. To this end, portion 22 further has a bracket 23 on its side facing the openings 20, 26, through which the cables and/or tubes are guided. This bracket has the function of constraining the cables and tubes to remain within the overall lateral dimension of portion 22 in the configurations of the wrist in which the second body 14 is rotated so that the opening 26 is displaced away from the condition aligned with opening 20. Furthermore, in the mounted and harnessed condition of the robot, the cables and/or tubes C extend, for a portion of their length, substantially aligned with axis IV and, for another portion of their length, substantially aligned with axis VI. This condition provides a reduction to a minimum of the torsional and bending stresses to which the cables are subjected during the manoeuvres of the robot wrist.

In the robot wrist described herein, the means for driving the rotation of the second body 14 and the third body 16 are mounted directly on the structure of the wrist itself. In particular the driving means comprise a first motor 28 and a second motor 30 which are both carried by the offset portion 22 of the first body 12. As will be described more in detail in the following, these driving means further comprise first gear means for transmitting the rotation of the output shaft of said first motor to said second body, and second gear means for transmitting the rotation of the output shaft of the second motor 30 to the third body 16.

In the robot wrist described herein, at its end opposite to the elbow-shaped portion 18, the offset portion 22 of the first body 12 has a fork-shaped portion 32, corresponding to said second end of the first body. This fork-shaped portion 32 is arranged side by side, and spaced apart, with respect to the axis of opening 20 and the second body 14 is rotatably mounted thereon, around second axis V.

As will be seen herein in the following, this configuration of the offset portion enables the use of a kinematic chain for transmitting the movements from motors 28 and 30, respectively to the second body 14 and the third body 16, which is very simple and compact, the transmission of movement to the second and the third bodies being obtained through two different "routes", with a resulting greater reliability of the entire kinematic chain.

Figure 3:
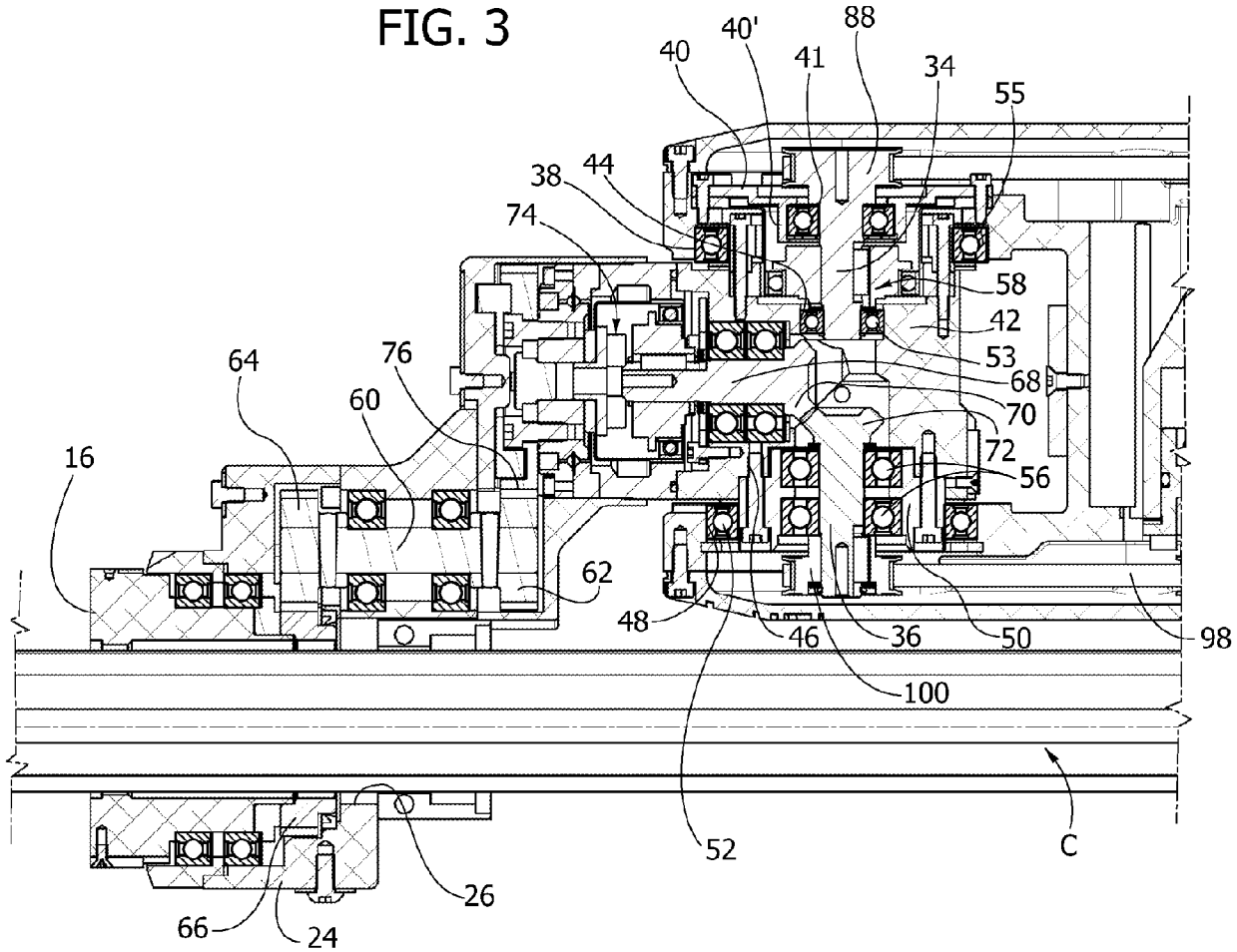
FIG. 3 shows a detail of FIG. 2 at an enlarged scale.
Figure 4:
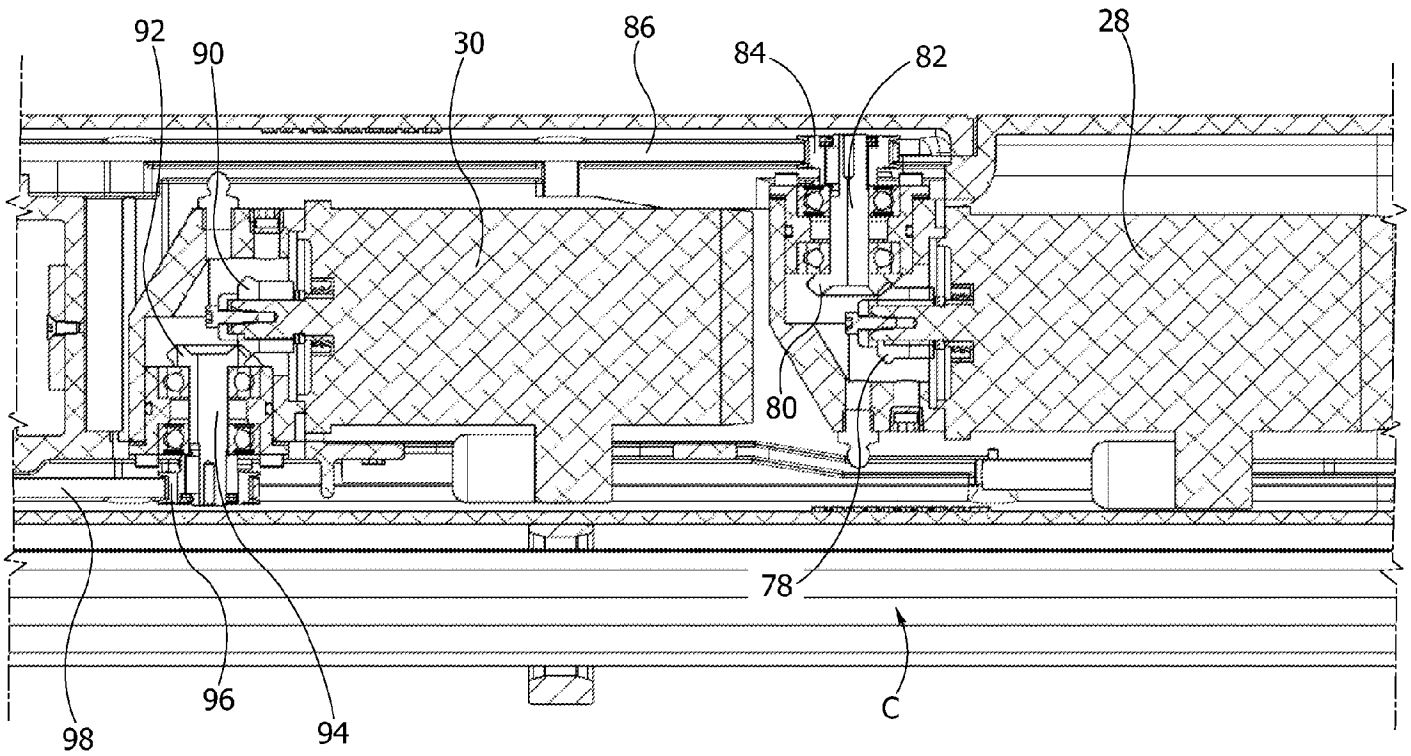
FIG. 4 shows a further detail of FIG. 2 at an enlarged scale.

In various embodiments, as well as in that shown in the figures, the first transmission means comprise a first shaft 34 rotatably mounted within a first arm 32' of the fork-shaped portion 32. As visible in FIG. 3, the first arm 32' has an opening 38 which is engaged by a plate 40 bolted to the edge of this opening, which has a central portion 40' with a hole, adapted to rotatably support shaft 34 around the second rotational axis V, with the interposition of a bearing member 41. As will be described more in detail in the following, shaft 34 is connected in rotation to the first motor 28 and is adapted to drive in rotation a second body 14.

On their turn, the second transmission means comprise a shaft 36 rotatably mounted on the second arm 32" of the fork-shaped portion, substantially in line with shaft 34. As will be described more in detail in the following, the second shaft 36 is connected in rotation to the second motor 30 and is adapted to drive the third body 16 in rotation.

The second body 14 comprises a base casing 42, corresponding to said first end of the second body, which is received within the space between the first and second arms of the fork-shaped portion and is rotatably supported thereby. More specifically, casing 42 has two opposite sides with a first opening 44 and a second opening 46 through which shaft 34 and shaft 36 are respectively received and rotatably supported with interposition of bearing members 53 and 56. In particular, on the side of the second fork arm 32", a bush 50 bolted to casing 42 engages the opening 46 and rotatably supports shaft 36 through bearing members 56. The same bush 50 is rotatably supported by a bearing member 52 which is arranged on an opening 48 provided in the second fork arm 32", opening 48 being substantially specularly arranged with respect to opening 38 of the first arm. The bearing member 52 acts also as an abutment member on one side of casing 42 and, similarly, a bearing member 55, mounted on opening 38 of fork arm 32', acts as an abutment member on the opposite side of this casing.

Casing 42 is driven in rotation by shaft 34. In particular, between shaft 34 and casing 42 there is interposed a reducer means 58 which is supported by the bearing member 55 and is adapted to connect in rotation shaft 34 to casing 42. The reducer means which has been shown in the figures is a harmonic reducer of a specific type which is conventionally used in the field of robots, and therefore it is not described herein in detail. In any case, it is clearly evident that the reducer means shown merely constitutes an example and in place thereof a reducer means of any other type conventionally used in this field may be adopted.

Casing 42 further contains transmission means (which will be described more in detail in the following) adapted to transmit rotation of second shaft 36 to further transmission members which are arranged within the cantilever portion 24 and are adapted to drive the third body 16.

In various embodiments, as well as in that shown herein, inside the cantilever portion 24 the second body 14 comprises, a shaft 60 which is freely rotatably mounted around an axis parallel to the third axis VI. Shaft 60 is connected in rotation to said transmission means and on its turn transmits the rotation to the third body 16. In particular, shaft 60 has a first end which carries a gear wheel 62 which is engaged by said transmission means and a second end opposite to the first end which carries a gear wheel 64 which engages a gear wheel 66 [carried by] *rigidly connected to* the third body 16. It is be noted that due to shaft 60 the third body 16 as well as the terminal part of portion 24 supporting the third body 16 can be positioned much forwardly with respect to the fork portion 32, so as to allow a distance between second axis V and opening 26 of cantilever portion 24 that reduces to a minimum the torsional and/or bending stresses of the cables and/or tubes C through opening 26, which may be due to the rotation of the second body 14 around second axis V.

In various embodiments, as well as in that shown herein, the transmission means indicated above comprise a shaft 68 which is rotatably mounted within casing 42 around an axis parallel to third axis VI and arranged on the opposite side with respect to shaft 60. Shaft 68 has a first end with a bevel gear wheel 70 engaging a corresponding gear wheel *72* carried by shaft 36. Furthermore, this transmission means comprise a reducer means 74 which at its input is coupled to a second end of shaft 68 opposite to the above mentioned first end. At its output reducer means 74 is coupled to a gear wheel 76 which engages the gear wheel 62 carried by shaft 60. The reducer means which has been shown in the figures is a harmonic reducer of a specific type which is conventionally used in the field of robots and therefore is not described in detail herein. In any case, it is clearly apparent that the reducer means shown herein constitutes only an example and in place thereof a reducer means of any other type conventionally used in this field may be adopted.

With reference now to FIGS. [2 and 4] *2-4*, the first motor 28 and the second motor 30 are mounted inside offset portion 22 and substantially aligned with each other. The output shafts of motors 28 and 30 are connected to shafts 34 and 36 through respective belt transmissions. In particular, a bevel gear wheel 78 is secured to the output shaft of motor 28 and engages a bevel gear wheel 80 carried by a shaft 82 which is rotatably mounted within the offset portion 22 around an axis parallel and spaced apart from the second axis V. Shaft 82 has its end opposite to wheel 80 carrying a pulley 84 which is connected in rotation through a transmission belt 86 to a pulley 88 carried by shaft 34. Similarly, on the output shaft of the second motor 30 there is secured a bevel gear wheel 90 which engages a bevel gear wheel 92 carried by a shaft 94 which is mounted in the offset portion 22, on the side of this portion opposite with respect to shaft 82. Shaft 94 is rotatable around an axis parallel and spaced from the second axis V. Shaft 94 has its end opposite to wheel 92 carrying a pulley 96 which is connected in rotation, through a transmission belt 98, to a pulley 100 carried by shaft 36.

In view of the foregoing, the transmission of movement to the second and third bodies, respectively in the rotations around axes V and VI, are obtained as described in the following.

When the first motor 28 is activated, shaft 82 is rotated, so as to drive rotation of shaft 34 through belt 86. Shaft 34 transmits its movement to the reducer means [38] *58*, which carries out a multiplication of torque, finally transmitting the rotation directly to the casing 42 of second body 14.

Similarly, when the second motor 30 is activated, shaft 94 is rotated, so as to drive rotation also of shaft 36 through belt 98. Shaft 36 drives rotation of shaft 68, which transmits its movement to the reducer means 74. The latter carries out a multiplication of torque, transmitting the movement to the gear wheel 76. On its turn, wheel 76 rotates shaft 60 and wheel 64, which, by engaging gear wheel 66, finally drives rotation of the third body 16.

It is to be noted that during the rotation of the second body 14, shaft 68 is caused to oscillate with respect to shaft 36. Due to the rotational connection between these two shafts, this oscillation would tend to rotate shaft 68 around its axis and then to cause an undesired actuation of the third body. In order to avoid this drawback, during the oscillation of shaft 68 the second motor 30 is controlled to rotate shaft 36 in a manner coordinated with this oscillation, so that shaft 68 does not rotate around its axis. Obviously, in cases in which a simultaneous actuation of the second and third bodies is requested, motor 30 is suitably controlled so that shaft 36 is able to transmit a rotation to shaft 68 corresponding to the desired movement for the third body.

It is finally to be noted that the above mentioned motors 28 and 30 have not been described herein in detail, since they can be of any type which is conventionally used in the field of robots. Similarly, some constructional details shown in the figures have not been described, to avoid an unnecessary complicated description, but they will be anyway clearly evident to the persons skilled in the art.

Naturally, while the principle of the invention remains the same, the details of construction and the embodiments may widely vary with respect to what has been described purely by way of non limiting example, without departing from the scope of the invention, as defined in the annexed claims.

What is claimed is:

1. An articulated robot wrist comprising:

a first body comprising a first end and a second end, said first end of said first body being [intended] *configured* to be mounted on a robot component that is rotatable around a first axis;

a second body comprising a first end and a second end, said first end of said second body being rotatably mounted on said second end of said first body, around a second axis [inclined] *angled* with respect to said first axis;

a third body comprising a first end and a second end, said first end of said third body being rotatably mounted on said second end of said second body, around a third axis [inclined] *angled* with respect to said second axis, wherein said first and third axes are both substantially orthogonal to said second axis, and wherein in at least one position of said robot wrist said first and third axes are substantially aligned with each other, wherein said first body comprises a substantially elbow-shaped portion having a base with a first opening facing towards said second and third bodies, and arranged substantially aligned with said first axis in [the] *a* mounted condition of said robot wrist, wherein said elbow-shaped portion carries an offset portion arranged substantially side by side, and spaced apart, with respect to [the] *an* axis of said first opening, with said second end of said first body being provided on said offset portion, wherein said second body comprises a cantilever portion, corresponding to said second end of said second body, which has a second opening substantially aligned with said third axis, and wherein, in the mounted condition of said robot wrist, said first and second openings are traversed by cables [and/or] *or* tubes *or both* for the supply [and/or] *or* control *or both* of a device [associated] *connected* to said third body of the robot wrist, said robot wrist further comprising means for driving rotation of said second and third bodies around said second and third axes, respectively, wherein said means for driving rotation of said second and third bodies comprise:

a first motor and a second motor carried by said offset portion of said first body;

first [gear] *transmission* means for transmitting rotation of [the] *an* output shaft of said first motor to said second body; and second [gear] *transmission* means for transmitting rotation of [the] *an* output shaft of said second motor to said third body, wherein at an end of the robot wrist opposite to said elbow-shaped portion, said offset portion of said first body has a fork-shaped portion corresponding to said second end of said first body, which is arranged side by side and spaced apart with respect to the axis of said first opening, and on which said second body is rotatably mounted around said second axis.

2. The articulated robot wrist according to claim 1, wherein said first transmission means comprises a first shaft which is rotatably mounted within a first arm of said [fork] *fork-shaped* portion around said second axis of rotation, said first shaft being connected in rotation to said first motor and adapted to drive rotation of said second body, and wherein said second transmission means comprises a second shaft which is rotatably mounted within a second arm of said [fork] *fork-shaped* portion and aligned with said first shaft, said second shaft being connected in rotation to said second motor and adapted to drive rotation of said third body.

3. The articulated robot wrist according claim 1, wherein said first and second motors are substantially aligned with each other within said offset portion.

4. The articulated robot wrist according to claim 2, wherein said first shaft is connected in rotation to said first motor by means of a belt transmission.

5. The articulated robot wrist according to claim 2, wherein said second shaft is connected in rotation to said second motor by means of a belt transmission.

6. The articulated robot wrist according to claim 2, wherein within said cantilever portion said second body comprises a shaft rotatably mounted around an axis parallel to said third axis, and connected in rotation to said second shaft by gear means forming part of said second transmission means, said shaft of said cantilever portion carrying, at a first end, a gear wheel engaged by said gear means and, at a second end opposite to said first end, a gear wheel engaging a gear wheel rigidly connected to said third body.

7. The articulated robot wrist according to claim 2, wherein said second body comprises a base casing corresponding to said first end of said second body, which is received in [the] *an* interspace between said first and second arms of said [fork] *fork-shaped* portion and is rotatably supported by said arms, said base casing being adapted to receive said first and second shafts, respectively through a first and a second opening at opposite sides of said casing, said first shaft driving rotation of said base casing, and wherein said base casing contains gear means adapted to transmit the rotation of said second shaft to transmission elements of said second transmission means, which are contained within said cantilever portion of said second body.

8. The articulated robot wrist according to claim 7, wherein between said base casing and said first shaft there is interposed a reducer means supported by said first arm and adapted to connect in rotation said first shaft with said casing.

9. The articulated robot wrist according to claim 7, wherein said gear means comprises:

a shaft rotatably mounted within said base casing, around an axis parallel and at a distance with respect to said third axis, said shaft of said gear means carrying, at a first end, a bevel gear wheel engaging a gear wheel carried by said second shaft; and a reducer means *having an input and an output and* coupled, at its input, to a second end of said shaft of said gear means, and *coupled*, at its output, to a gear wheel for transmission of rotation to *said* transmission elements of said second transmission means, which are contained within said cantilever portion of said second body.

10. The articulated robot wrist according to claim 3, wherein a bevel gear wheel is secured to the output shaft of said first motor and engages a bevel gear wheel carried by a third shaft, which is rotatably mounted within said offset portion around an axis parallel and at a distance with respect to said second axis, said third shaft having, at one end thereof opposite to said gear wheel, a pulley, which is connected in rotation by means of a transmission belt to a pulley carried by said first shaft, and wherein a bevel gear wheel is secured to the output shaft of said second motor and engages a bevel gear wheel carried by a fourth shaft, which is mounted within said offset portion, on a side opposite with respect to said third shaft, and is rotatable around an axis parallel and at a distance with respect to said second axis, said fourth shaft having, at one end thereof opposite to said bevel gear wheel, a pulley which is connected in rotation by means of a transmission belt to a pulley carried by said second shaft.

* * * * *